US010842064B2

(12) United States Patent
Dufty (10) Patent No.: US 10,842,064 B2
(45) Date of Patent: Nov. 24, 2020

(54) ROLLING ASSEMBLY

(71) Applicants: Dorothea Isabel Maud Rix, Arundel (AU); Raymond Jeffrey Dufty, Arundel (AU)

(72) Inventor: Raymond Jeffrey Dufty, Arundel (AU)

( * ) Notice: Subject to any disclaimer, the term of this patent is extended or adjusted under 35 U.S.C. 154(b) by 15 days.

(21) Appl. No.: 15/737,010

(22) PCT Filed: Jun. 16, 2016

(86) PCT No.: PCT/AU2016/050501
§ 371 (c)(1),
(2) Date: Dec. 15, 2017

(87) PCT Pub. No.: WO2016/201509
PCT Pub. Date: Dec. 22, 2016

(65) Prior Publication Data
US 2018/0359900 A1    Dec. 20, 2018

(30) Foreign Application Priority Data

Jun. 16, 2015 (AU) .................................. 2015902292

(51) Int. Cl.
| A01B 29/06 | (2006.01) |
| A01B 29/02 | (2006.01) |
| A01G 20/30 | (2018.01) |
| A01G 20/35 | (2018.01) |
| A01B 45/00 | (2006.01) |

(52) U.S. Cl.
CPC .............. *A01B 29/06* (2013.01); *A01B 29/02* (2013.01); *A01G 20/30* (2018.02); *A01G 20/35* (2018.02); *A01B 45/00* (2013.01)

(58) Field of Classification Search
CPC ................................ A01B 29/06; A01G 20/35
USPC .......................................................... 56/249
See application file for complete search history.

(56) References Cited

U.S. PATENT DOCUMENTS

| 3,490,087 A * | 1/1970 | Krier et al. .......... A46B 13/003 |
| | | 15/179 |
| 5,682,735 A * | 11/1997 | Swenson et al. ...... A01D 34/54 |
| | | 56/17.1 |
| 6,029,433 A * | 2/2000 | Westbrook et al. ... A01D 34/62 |
| | | 56/249 |
| 6,688,094 B2 * | 2/2004 | Berndt et al. ........ A01D 34/003 |
| | | 56/249 |
| 6,945,021 B2 * | 9/2005 | Michel ................... A01D 42/00 |
| | | 56/249 |

(Continued)

FOREIGN PATENT DOCUMENTS

| GB | 212703 A | 3/1924 |
| GB | 381331 A | 10/1932 |
| WO | 20150381378 A1 | 6/2015 |

*Primary Examiner* — Thomas B Will
*Assistant Examiner* — Joel F. Mitchell
(74) *Attorney, Agent, or Firm* — Hudak, Shunk & Farine Co. LPA (57) ABSTRACT

A rolling assembly, the rolling assembly including: a body; one or more surface rollers rotatable with respect to the body; and at least one rotatable sweeping device including: an elongate member rotatable with respect to the body; and a sweeping head located over the elongate member and rotatable with respect to the elongate member, wherein the sweeping head is configured to engage with the one or more surface rollers such that the rotation of the one or more surface rollers rotates the sweeping head.

19 Claims, 5 Drawing Sheets

(56) References Cited

U.S. PATENT DOCUMENTS

| | | | |
|---|---|---|---|
| 7,530,214 B1 * | 5/2009 | Rinholnn et al. | A01D 34/43 56/16.9 |
| 7,661,257 B2 * | 2/2010 | Slater et al. | A01B 29/06 56/249.5 |
| 8,418,304 B2 * | 4/2013 | Dairon et al. | A01G 20/43 15/83 |
| 8,499,849 B2 * | 8/2013 | Dufty | A01G 20/43 172/521 |
| 2012/0180448 A1 | 7/2012 | Slater et al. | |
| 2012/0247794 A1 | 10/2012 | Dufty | |

* cited by examiner

ROLLING ASSEMBLY

FIELD OF THE INVENTION

The invention relates to a rolling assembly. In particular, the invention relates, but is not limited, to a rolling assembly for smoothing turf.

BACKGROUND TO THE INVENTION

Reference to background art herein is not to be construed as an admission that such art constitutes common general knowledge in Australia or elsewhere.

Turf rollers are typically used in the maintenance of, for example, golf greens. Turf rollers assist in providing a firm, smooth and consistent golf green. However, when grass cuttings, for instance, become stuck to rollers within the turf roller, this affects the smooth and consistent operation of the turf roller. In particular, when grass cutting clump together, the rotation of the rollers is interrupted and this adversely affects the rolling operation.

To overcome the abovementioned problem, brushes have been mounted adjacent to rollers to provide a means for cleaning the rollers of grass cuttings. However, grass cutting have a tendency to become stuck between the brushes and the rollers. Furthermore, the brushes themselves may become stuck relative to the rollers. In these situations, movement of the rollers is affected which inhibits the smooth and consistent operation of the turf roller and the ground surface finish.

OBJECT OF THE INVENTION

It is an aim of this invention to provide a rolling assembly which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a rolling assembly, the rolling assembly including:
 a body;
 one or more surface rollers rotatable with respect to the body; and at least one rotatable sweeping device including:
   an elongate member rotatable with respect to the body; and
   a sweeping head located over the elongate member and rotatable with respect to the elongate member,
 wherein the sweeping head is configured to engage with the one or more surface rollers such that the rotation of the one or more surface rollers rotates the sweeping head.

Preferably, the sweeping head includes a rotatable body and a sweeping portion. Typically, the sweeping portion extends radially from a longitudinal axis of the rotatable body. Normally, the sweeping portion extends helically around the rotatable body.

Preferably, the rotatable body is a hollow body. Preferably, the elongate member extends through the rotatable body. Normally, an inner bearing surface of the rotatable body bears and rotates on the elongate member. Typically, the rotatable body is a cylinder.

Preferably, the sweeping head includes a plurality of nodules. Typically, the plurality of nodules extend in a radial direction from a longitudinal axis of the elongate member. Preferably, the plurality of nodules are frustoconical in shape. Normally, the plurality of nodules are arranged in a single file and extend in helical manner around the rotatable body. Preferably, the sweeping head includes a plastic. Preferably, the sweeping head includes a plastic in the form of rubber.

Preferably, the rolling assembly includes a plurality of sweeping heads. Typically, the plurality of sweeping heads are located over the elongate member and are rotatable with respect to the elongate member. Preferably, the plurality of sweeping heads abut one another along the elongate member. Normally, the plurality of sweeping heads are herein described with respect to the sweeping head.

Preferably, the at least one rotatable sweeping device includes one or more bearings. Typically, the one or more bearings are configured to rotate relative to the body and/or elongate member. Preferably, the one or more bearings are located along the elongate member. Preferably, the one or more bearings include two bearings located at respective ends of the elongate member.

Preferably, the rolling assembly includes one or more guides. Typically, the one or more guides guide the movement of the at least one rotatable sweeping device. Normally, the one or more guides guide the movement of the at least one rotatable sweeping device in a horizontal and/or upward direction.

Preferably, the one or more guides are located over the at least one rotatable sweeping device. Normally, the one or more guides are located over the one or more bearings. Typically, the one or more guides are located adjacent to the one or more bearings. Preferably, the one or more guides are located adjacent to ends of the at least one rotatable sweeping device.

Preferably, the one or more guides are connected to sides of the body. Typically, the one or more guides includes two side portions separated by an aperture. Normally, the one or more guides include a channel. Preferably, the one or more guides are substantially U-shaped.

Preferably, the one or more surface rollers assist in preventing the at least one rotatable sweeping device from falling from the body. That is, preferably the one or more surface rollers assist in retaining the at least one rotatable sweeping device in the body. Normally, the rolling assembly includes a plurality of rotatable sweeping devices respectively located above the one or more surface rollers.

Preferably, the rotatable sweeping device is configured to move from a first position to a second position. Preferably, the rotatable sweeping device is configured to move from the second position to the first position under a gravity force alone. Preferably, in an inverted non-working position, the rotatable sweeping device is configured to move from first position to a second position under a gravity force alone.

Typically, in the first position is the sweeping head is engaged with the one or more rollers and in the second position the sweeping head is disengaged with the one or more rollers. That is, preferably, the at least one rotatable sweeping device is configured to move in an upward direction from its engagement position with the one or more surface rollers. Normally, the upward movement of the at least one rotatable sweeping device is guided/restricted by the one or more guides.

Preferably, the rolling assembly includes a pivot mount. Typically, the pivot mount is configured to pivot the body relative to a towing point.

Preferably, the body includes a top portion and two side portions. Preferably, the one or more surface rollers are releasably connected to the side portions.

Normally, the guide is releasable connected to the side portion. Preferably, the body includes a leading surface. Typically, the leading surface extends at an acute angle from the top portion.

In another form the invention resides in a rotatable sweeping device including:
- a sweeping head; and
- an elongate member having the sweeping head rotatably mounted thereto,
- wherein the sweeping head is positioned over the elongate member.

Preferably, the rotatable sweeping device is herein as described.

Normally, the sweeping head is positioned such that the elongate member extends therethrough. That is, preferably, the sweeping head is located between ends of the elongate member.

Typically, the longitudinal axis of the sweeping head is aligned with the longitudinal axis of the elongate members.

In another form the invention resides in a method for rolling a surface, the method including the steps of:
- engaging a sweeping head with one or more surface rollers, the sweeping head located over an elongate member and rotatable with respect to the elongate member; and
- rotating the one or more surface rollers causing rotation of the sweeping head.

Preferably, in response to the relative rotational movement between the sweeping head and elongate member being prevented, the method further includes rotating the sweeping head and elongate member relative to a bearing.

Preferably, in response to the relative rotational movement between the sweeping head, elongate member and bearing being prevented, the method further includes turning the bearing relative to a body and/or a guide.

Preferably, the method further includes moving the sweeping head in an upward direction to disengage from the one or more surface rollers.

Preferably, the method further includes connecting a pivot mount to a motorised vehicle. Typically, the pivot mount is herein as described.

Preferably, the sweeping head is herein as described.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
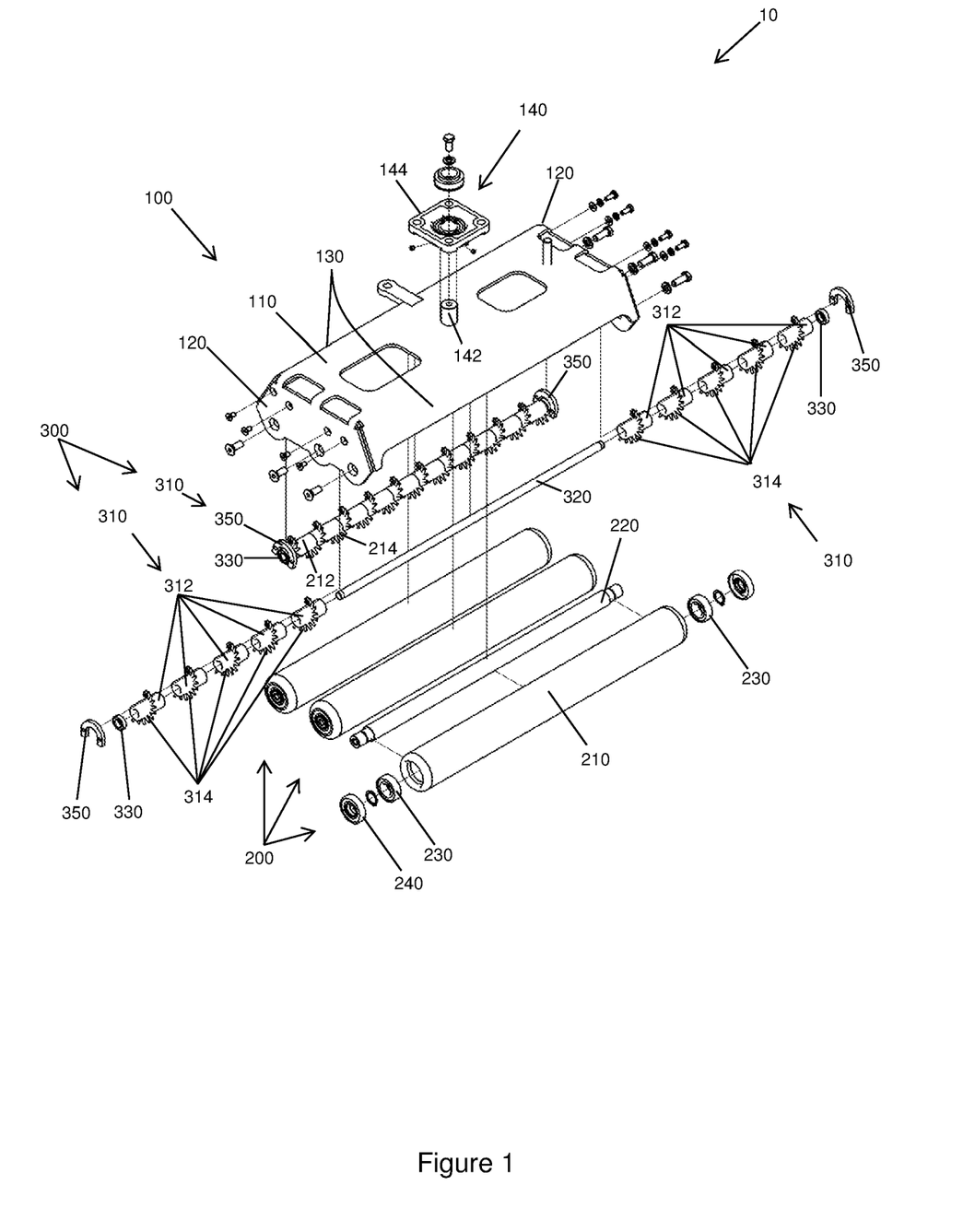
FIG. 1 illustrates an exploded view of a rolling assembly, according to an embodiment of the invention.

FIG. 1 illustrates an exploded view of a rolling assembly 10, according to an embodiment of the invention. The rolling assembly 10 includes a body 100, three surface rollers 200, two rotatable sweeping devices 300 and guides 350.

The body 100 includes an upper surface 110, two side surfaces 120 and leading surfaces 130. The two side surfaces 120 extend in a substantially perpendicular direction from the upper surface 110. The leading surfaces 130 extend at an acute angle from the upper surface 110. The upper surface 110, two side surfaces 120 and the leading surfaces 130 are formed from folded sheet metal in this embodiment. However, it would be appreciated by a person skilled in the art that these surfaces 110, 120, 130 may be made of alternative materials.

The two side surfaces 120 include a plurality of apertures therein such that fasteners are used to releasably connect surface rollers 200 and guides 350 thereto. In this regards, as shown further in FIG. 2, the surface rollers 200 extend between the two side surfaces 120. Furthermore, as outlined further below, the rotatable sweeping devices 300 are retained between the guides 350 and surface rollers 200 and extend substantially between the side surfaces 120.

The body 100 also includes a pivot mount 140. The pivot mount 140 includes a shaft 142 and a connector plate 144. The connector plate 144 is connected to a towing point (not shown). The pivot mount 140 allows the body 100 to pivot relative to the towing point via the shaft 142. This allows the angle of attack for the rolling assembly 10 to change depending on the surface terrain.

The surface rollers 200 include a tube 210, a shaft 220, two bearings 230 and casings 240. The bearings 230 are located at respective ends of the tube 210 and retained therein. The shaft 220 extends between the two bearings 230. The shaft 210 includes a fastening means at respective ends which allows the surface rollers 200 to be releasably connected to the sides 120. The casings 240 are also located at either ends of the tube 210 to cover the bearings 230.

Figure 2:
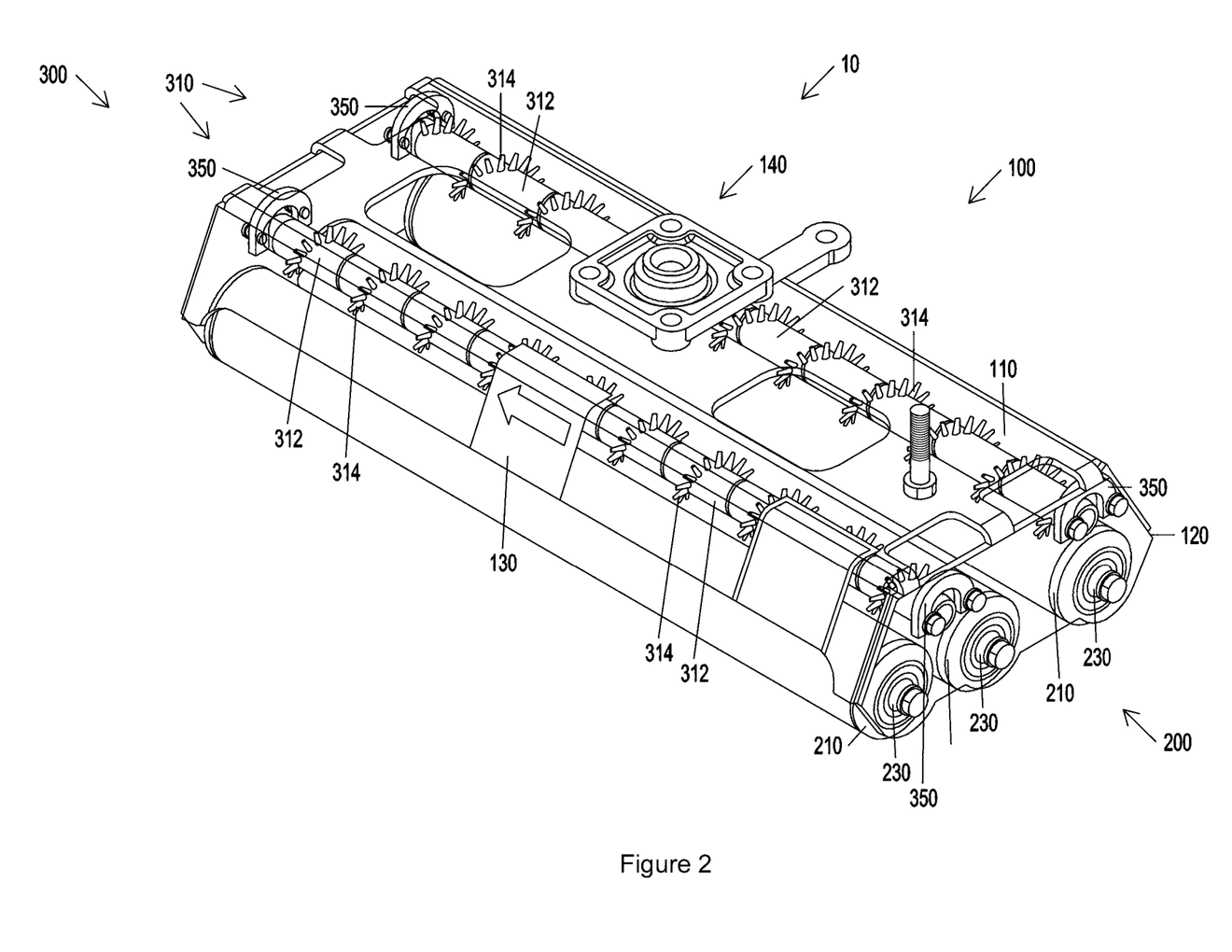
FIG. 2 illustrates transparent view of the rolling assembly shown in FIG. 1.

As shown further in FIG. 2, two surface rollers 200 are located near one of the leading surfaces 130 and one surface roller 200 is located near the other leading surface 130. The surface rollers 200 extend across the body 100. That is, a longitudinal axis of the surface rollers 200 extends substantially parallel to a longitudinal axis of the body 100. The surface rollers 200 also extend below the body 100.

In this embodiment, the rotatable sweeping devices 300 includes a plurality of sweeping heads 310, an elongate member in form of a shaft 320 and rotatable parts in the form of bearings 330. The rotatable sweeping devices 300 extend across the body 100 (i.e. extends in a direction substantially parallel with the longitudinal axis of the body 100 and surface rollers 200).

Figure 3:
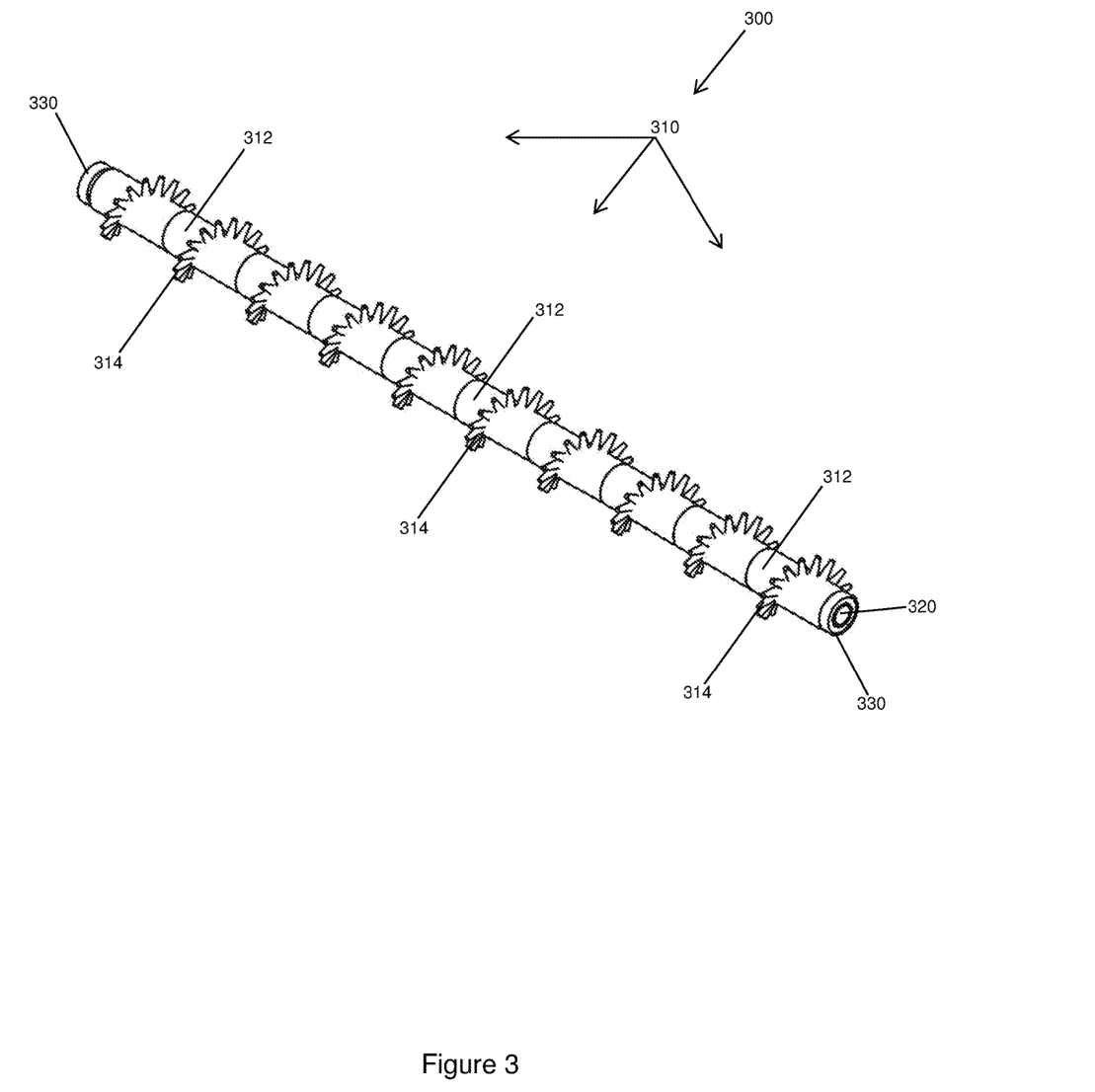
FIG. 3 illustrates a rotatable sweeping device according to an embodiment of the invention shown in FIG. 1.

One of the rotatable sweeping devices 300 is shown further in FIG. 3. The sweeping heads 310 are each made of rubber but may be of other alternative materials. The sweeping heads 310 include a rotatable body 312 and a sweeping head comprising a plurality of nodules 314. The rotatable body 312 is in the form of a tube. The plurality of nodules 314 extend in a radial direction from a longitudinal axis of the rotatable body 312 and the shaft 320. The plurality of nodules 314 are frustoconical in shape and extend in a single file around the rotatable body 312 in a helical manner. However, it would be appreciated by a person skilled in the art that other nodule configurations may work in the present embodiment.

The shaft 320 receives the plurality of sweeping heads 310 thereover. That is, the plurality of sweeping heads 310 are positioned between the ends of the shaft 320. The plurality of sweeping heads 310 abut each other along the shaft 320. The rotatable bodies 312 includes an inner surface that bears and rotates on the shaft 320. Located at the ends of the shaft 320 are the bearings 330.

The guides 350 are substantially U-shaped in this embodiment. The guides 350 are located over the bearings 330 and connected the side walls 120. The guides 350 restrict/guide the movement of the bearings 330 in a horizontal and/or upward direction. However, the guides 350 do not restrict movement of the bearings 330 in a downward direction. Rather, the engagement between the sweeping heads 310 and the rollers 200 restricts the movement of the rotatable sweeping devices 300 (and therefore bearings 330) in a downward direction, as outlined further below.

Figure 4:
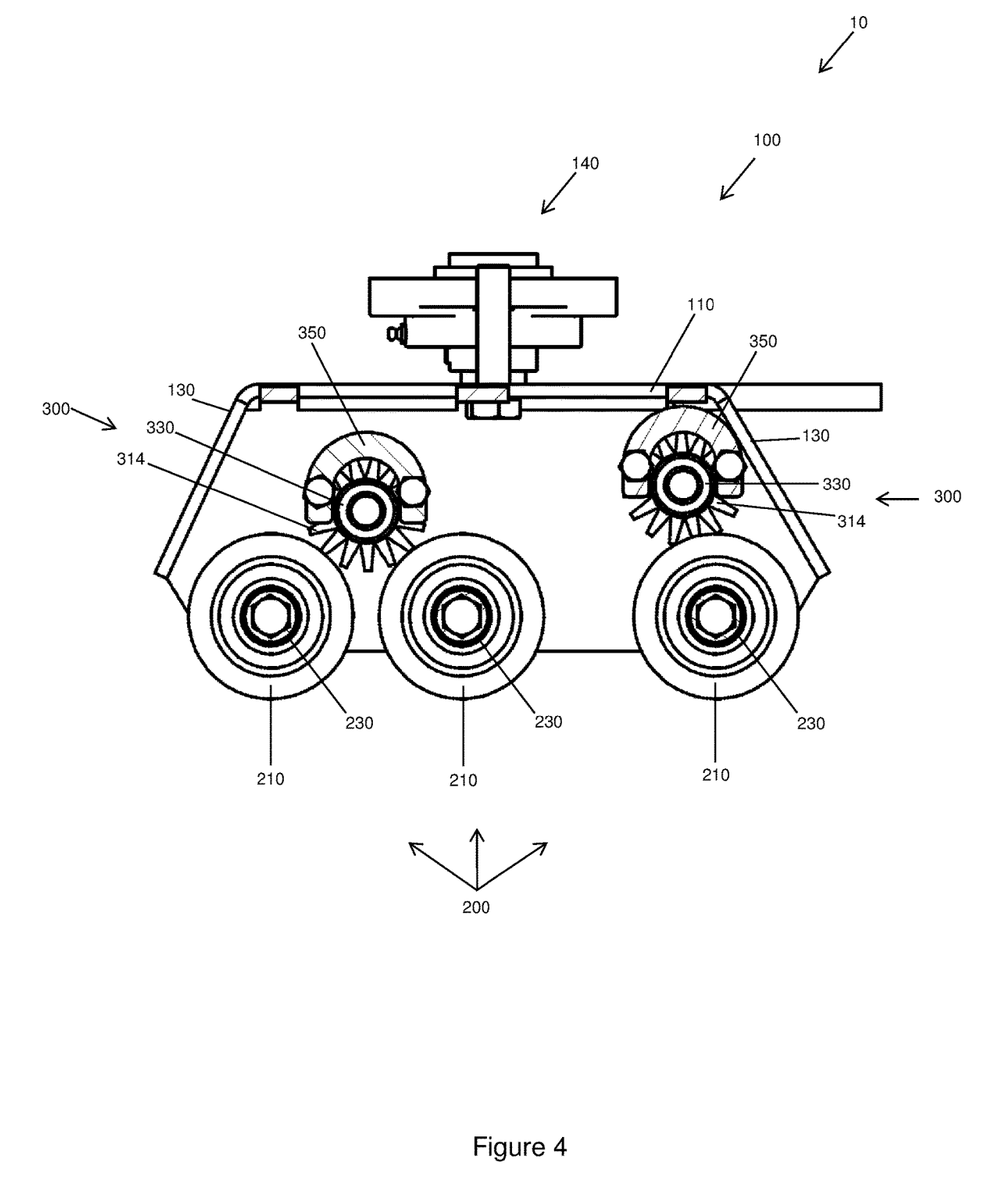
FIG. 4 illustrates a side section view of the rolling assembly, shown in FIG. 1.

As shown further in FIG. 4, one rotatable sweeping device 300 is located over the two surface rollers 200 near one leading surface 130. Another rotatable sweeping device is located over the other surface roller 200 near the other leading surface 130. The plurality of nodules 314 engage the surface rollers 200 therebelow and, therefore, the rotatable sweeping devices are retained between the surface roller(s) and the guides 350.

In use, the pivot mount 140 of the rolling assembly 10 is typically connected to a motorised vehicle. When the motorised vehicle moves over a ground surface, the surface rollers 200 begin to rotate as they are engaged with the ground surface. The pivot mount 140 allows the angle of the rolling assembly 10 to adjust depending on the ground surface shape.

Movement of the surface rollers 200 and their interaction with the plurality of nodules 314 causes the sweeping heads 310 to rotate. This allows the sweeping heads 310 to assist in removing foreign objects (e.g. grass cuttings and alike) from the surface rollers 200. In particular, the plurality of nodules 314 try to dislodge foreign objections (e.g. grass cuttings and alike) from the surface rollers 200 as they come in contact therewith.

With the above in mind, in response to a sweeping head 310 becoming fixed relative to the shaft 320 (i.e. stuck), the sweeping head 310 is still configured to rotate due to the relative movement between the shaft 320 and the bearings 330. It would be appreciated that other sweeping heads 310 may continue to rotate relative to the shaft 320 if they are not fixed (i.e. stuck) relative thereto.

In addition, if the relative movement between the bearings 330 and shaft 320 becomes fixed (i.e. the bearing 330 is ceased), the bearing 330 may continue to still turn within the guide 350 to allow the plurality of nodules 314 to continue to rotate relative to the surface rollers 200.

Figure 5:
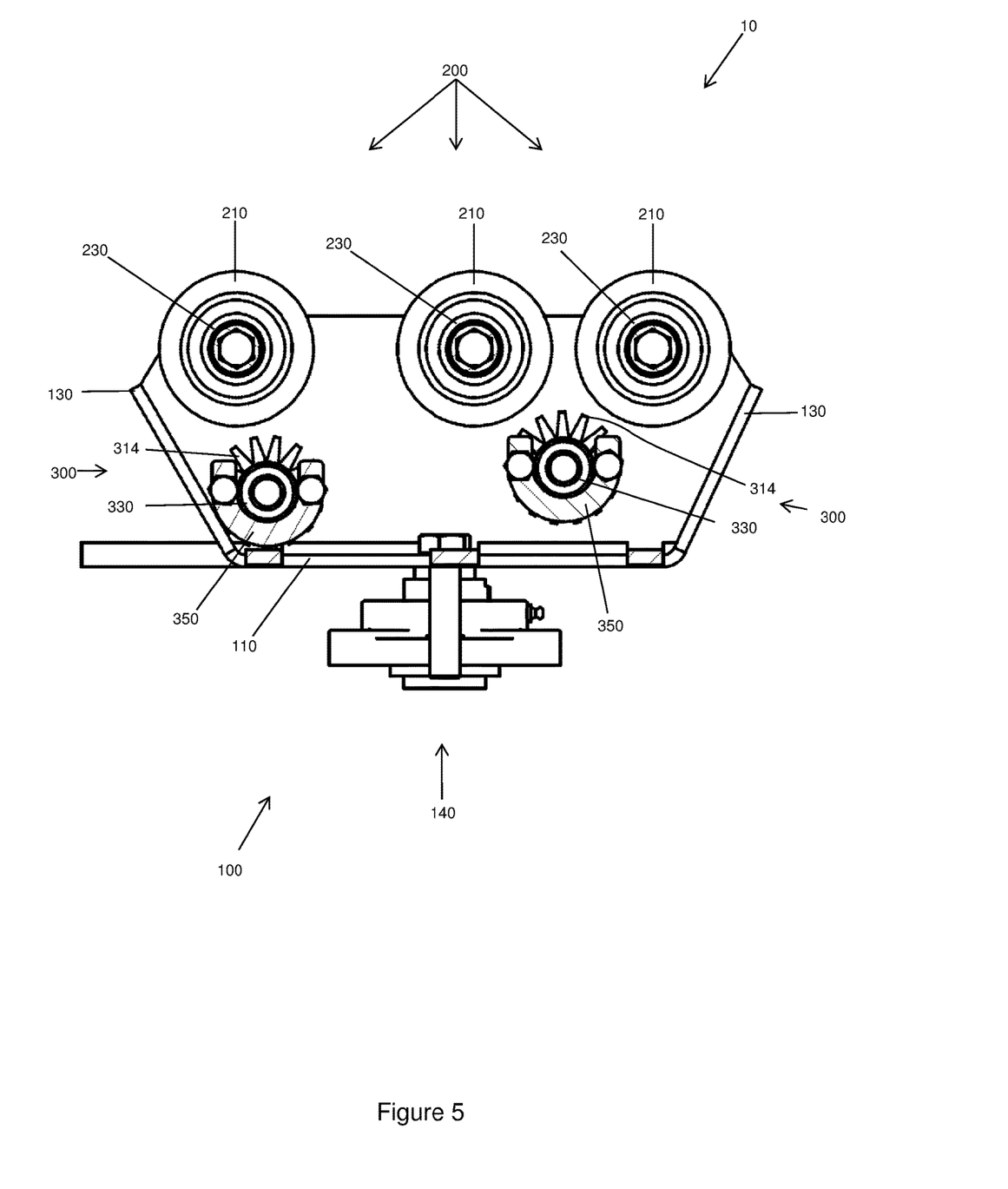
FIG. 5 illustrates a side section view of the rolling assembly, shown in FIG. 1, in an inverted non-working position.

Moreover, it would also be appreciated that in addition to the bearing 330 turning in the guide 350, the bearing 350 (and therefore the rotatable sweeping device 300) may move from a first position to a second position within the guide 350. That is, the rotatable sweeping device 300 may move from a first position, where plurality of nodules 314 engage the surface rollers 200, to a second position where plurality of nodules 314 are disengaged from the surface rollers 200. The second position is shown further in FIG. 5 where, in an inverted non-working position, the rotatable sweeping devices 300 are shown to have moved to an end of the guide 350. It would be appreciated that when the rolling assembly 10 is returned to its working position, as shown in FIG. 4, the rotatable sweeping device will move downward, due to gravity alone, and the plurality of nodules 314 will engage with the surface rollers 200.

Engagement between the plurality of nodules 314 and the surface rollers 200 assists in removing, for example, grass cuttings and other foreign matter from the surface rollers 200. This improves the smooth and consistent operation of the rolling assembly 10 and, therefore, the turf being rolled.

Allowing the sweeping heads 310 to rotate with respect to the shaft 320, bearings 330, guide 350 and/or body 100 also assists in ensuring that the nodules do not become fixed (i.e. stuck) relative to the surface rollers 200. Individual sweeping heads 310 may also continue to rotate, relative to the shaft 320, when other sweeping heads 310 are fixed relative to the shaft 320. These features help avoid the surface rollers 200 and sweeping heads 310 becoming, for example, abruptly jammed. This assists in the smooth and consistent rolling of, for instance, a golf green.

Similarly, allowing the rotatable sweeping devices 300 to move within the guides 350 assists in ensuring that the rotatable sweeping devices 300 do not become fixed (i.e. stuck) relative to the surface rollers 200. This again improves the smooth and consistent operation of the rolling assembly 10 and, therefore, the turf being rolled.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A rolling assembly, the rolling assembly including:
   a body;
   one or more surface rollers rotatable with respect to the body; and
   at least one rotatable sweeping device including:
   a shaft rotatably coupled to the body with the assistance of a bearing; and
   a plurality of sweeping heads located over the shaft and rotatable with respect to the shaft,
   wherein the sweeping heads are configured to engage with the one or more surface rollers such that the rotation of the one or more surface rollers rotates the sweeping heads, and
   wherein the sweeping heads are independently rotatable with respect to each other.

2. The rolling assembly of claim 1, wherein each of the sweeping heads includes a rotatable body and a sweeping portion, the sweeping portion of each of the sweeping heads extending radially from a longitudinal axis of the respective rotatable body.

3. The rolling assembly of claim 2, wherein the sweeping portion of each of the sweeping heads extends helically around the respective rotatable body.

4. The rolling assembly of claim 2, wherein the shaft extends through the rotatable body of each of the sweeping heads such that an inner bearing surface of the rotatable body of each of the sweeping heads bears and rotates on the shaft.

5. The rolling assembly of claim 1 wherein each of the sweeping heads includes a plurality of nodules.

6. The rolling assembly of claim 1 wherein the bearing is located on an end of the shaft.

7. The rolling assembly of claim 1 wherein one or more guides guide the movement of the at least one rotatable sweeping device.

8. The rolling assembly of claim 7, wherein the one or more guides guide the movement of the at least one rotatable sweeping device in a horizontal or upward direction.

9. The rolling assembly of claim 7, wherein the one or more guides are located adjacent to ends of the at least one rotatable sweeping device.

10. The rolling assembly of claim 1 wherein the one or more surface rollers assist in preventing the at least one rotatable sweeping device from falling from the body.

11. The rolling assembly of claim 1 a plurality of rotatable sweeping devices are respectively located above the one or more surface rollers.

12. The rolling assembly of claim 1 wherein the rotatable sweeping device is configured to move from a first position, where the sweeping heads are engaged with the one or more rollers, to a second position, where the sweeping heads are disengaged with the one or more rollers.

13. A rotatable sweeping device including:
a body
a plurality of sweeping heads; and
a shaft rotatably coupled to the body with the assistance of a bearing, the sweeping heads rotatably mounted on the shaft,
wherein the sweeping heads are positioned over the shaft, and
wherein the sweeping heads are independently rotatable with respect to each other.

14. The rotatable sweeping device of claim 13, wherein the sweeping heads are positioned such that the shaft extends therethrough.

15. A method for rolling a surface, the method including the steps of:
engaging a plurality of sweeping heads with one or more surface rollers, the sweeping heads located over a shaft that is rotatably coupled to a body, with the assistance of a bearing and the sweeping heads being rotatable with respect to the shaft and with respect to each other; and
rotating the one or more surface rollers causing rotation of the sweeping heads.

16. The method of claim 15, wherein in response to relative rotational movement between at least one of the sweeping heads and shaft being prevented, the method further includes rotating the at least one of the sweeping heads and shaft relative to the bearing.

17. The method of claim 16, wherein in response to relative rotational movement between the at least one of the sweeping heads, shaft and bearing being prevented, the method further includes turning the bearing relative to a body or a guide.

18. The method of claim 15, wherein the method further includes moving the sweeping heads in an upward direction to disengage from the one or more surface rollers.

19. The method of claim 15, wherein the method further includes connecting a pivot mount to a motorised vehicle.

* * * * *